United States Patent [19]
Turney et al.

[11] Patent Number: 5,881,765
[45] Date of Patent: Mar. 16, 1999

[54] DIRECT-ACTING BOOST-ENHANCED PRESSURE REGULATOR

[75] Inventors: Christopher G. Turney; Paul W. Heald, both of San Marcos, Tex.

[73] Assignee: S. H. Leggitt Company, San Marcos, Tex.

[21] Appl. No.: 952,547

[22] PCT Filed: Mar. 28, 1997

[86] PCT No.: PCT/US97/05119

§ 371 Date: Nov. 21, 1997

§ 102(e) Date: Nov. 21, 1997

[87] PCT Pub. No.: WO97/37162

PCT Pub. Date: Oct. 9, 1997

[51] Int. Cl.$^6$ ................................................. F16K 17/34
[52] U.S. Cl. ................................. 137/484.4; 137/505.46
[58] Field of Search ........................... 137/484.2, 484.4, 137/505.46, 505.47

[56] References Cited

U.S. PATENT DOCUMENTS

| | | |
|---|---|---|
| 409,627 | 8/1889 | Bell . |
| 468,915 | 2/1892 | Kraiss . |
| 578,297 | 3/1897 | Sharpneck et al. . |
| 1,839,980 | 1/1932 | Luchs et al. . |
| 1,874,680 | 8/1932 | Wolfe . |
| 1,893,254 | 1/1933 | Sweeney . |
| 1,934,832 | 11/1933 | Temple ........................................ 50/26 |
| 2,015,930 | 10/1935 | Groble ................................. 137/505.46 |
| 2,095,210 | 10/1937 | Bucknam ............................ 137/505.46 |
| 2,102,007 | 12/1937 | Kimball ..................................... 121/41 |
| 2,192,327 | 3/1940 | Palmer ................................. 137/484.4 |
| 2,215,419 | 9/1940 | Cheeseman ........................... 137/484.4 |
| 2,373,268 | 4/1945 | Shelly ........................................ 251/39 |
| 2,499,318 | 2/1950 | Jungerhans ..................................... 277/8 |
| 2,951,494 | 9/1960 | Holmes ................................ 137/484.4 |
| 3,156,174 | 11/1964 | Replogle ..................................... 98/1.5 |
| 3,207,175 | 9/1965 | Pauly .................................. 137/505.46 |
| 3,242,938 | 3/1966 | Smilg et al. ............................... 137/63 |
| 3,892,255 | 7/1975 | Johnson ................................ 137/116.5 |
| 3,989,060 | 11/1976 | Hughes ................................. 137/484.2 |
| 4,019,531 | 4/1977 | Johnson ................................... 137/504 |
| 4,140,112 | 2/1979 | Kobzan ................................. 128/142.2 |
| 4,140,113 | 2/1979 | Pedersen .............................. 128/142.2 |
| 4,182,323 | 1/1980 | Pedersen ............................ 128/204.25 |
| 4,214,580 | 7/1980 | Pedersen ............................ 128/204.26 |
| 4,297,998 | 11/1981 | Christianson ....................... 128/204.26 |
| 4,446,859 | 5/1984 | Pederson ............................ 128/204.26 |

(List continued on next page.)

FOREIGN PATENT DOCUMENTS

| | | | |
|---|---|---|---|
| 240943 | 7/1959 | Australia ............................ 137/484.4 |
| 688735 | 3/1953 | United Kingdom .............. 137/505.46 |

*Primary Examiner*—Denise L. Ferensic
*Assistant Examiner*—Ramyar Farid
*Attorney, Agent, or Firm*—Price, Heneveld, Cooper, DeWitt & Litton

[57] ABSTRACT

A boost-enhanced gas pressure regulator consists of a bonnet and a body (main casing) that are secured together so as to capture a pressure-responsive diaphragm between both components. The body has an inlet port and one or more outlet ports. An actuator providing a camming means, preferably in the form of a pair of spaced control channels, is connected to the diaphragm to be moved with and by the latter. The camming means/control channels engage a corresponding pair of control pins on opposite sides of a movable boost tube, such that there is a direct-acting connection between the diaphragm and boost tube. The boost tube has external guide surfaces which serve to guide and control its movement, and it also has an internal gas flow passage in which a valve seat disk (valve member) is mounted. The boost tube is restricted to travel in a linear fashion with respect to an inlet orifice/valve seat by a plurality of mutually spaced guides that are an integral part of the orifice insert, upon which certain contact areas of the guide surfaces on the boost tube are slidable. The control channels, control pins, guide surfaces, and contact areas are designed to cooperatively mount the boost tube so as to position and guide it in precise, low-friction motion that mechanically induces a velocity boosting effect.

38 Claims, 6 Drawing Sheets

U.S. PATENT DOCUMENTS

| | | | |
|---|---|---|---|
| 4,491,149 | 1/1985 | Trinkwalder | 137/505.46 |
| 4,549,719 | 10/1985 | Baumann | 251/280 |
| 4,665,945 | 5/1987 | Suzuki | 137/613 |
| 4,754,778 | 7/1988 | Duffy et al. | 137/484.8 |
| 4,842,013 | 6/1989 | Rice et al. | 137/484.4 |
| 4,889,158 | 12/1989 | Rice | 137/505.46 |
| 4,972,868 | 11/1990 | Davis et al. | 137/116.5 |
| 4,972,871 | 11/1990 | Rice | 137/484.4 |
| 5,062,449 | 11/1991 | Woollums | 137/505.46 |
| 5,103,861 | 4/1992 | Lin | 137/505.46 |

DIRECT-ACTING BOOST-ENHANCED PRESSURE REGULATOR

BACKGROUND AND GENERAL SUMMARY OF THE INVENTION

This invention is applicable to a wide range of gas pressure-regulating applications, but is designed for particularly advantageous use in propane outdoor cooking appliance applications. For example, the device may be used to supply an appliance with a consistent pressure in the range of 11 inches of water column when provided with inlet pressures up to 250 psig. Many conventional devices used in these applications experience three flow performance limitations that are inherent to their design. The first limitation is termed "droop, " i.e. pressure droop, which is caused by the change in the effective area of the diaphragm as it moves and the loss of load experienced by the diaphragm control spring throughout the same motion. These factors combine to cause the delivery (output) pressure to decrease as flow increases. The described invention partially overcomes this limitation by using velocity boosting to compensate. Velocity boosting subjects the diaphragm to a lower pressure than the controlled downstream pressure, which allows for a larger valve opening and higher flow rates. The second limitation, hysteresis or backlash, is partially caused by change of direction of friction forces throughout the range of motion for the device. Hysteresis causes inconsistency in the performance of such a device. The described invention reduces the effect of this limitation by providing a novel floating suspension for valving and velocity-boost components together with smoothly rounded continuous guides and slide surfaces providing essentially point-to-point controlled, low-friction contact for mechanism control. This combined with novel and improved component configurations and actuation mechanisms provides a device having novel control and operational characteristics which produce significantly enhanced performance consistency. The third limitation is caused by physical obstructions in the flow path direction. The described invention has eliminated virtually all unnecessary obstructions from the flow stream.

OBJECTS OF THE INVENTION

Broadly stated, the principal object of the invention is to provide a new and novel gas pressure regulator for use in propane outdoor cooking appliance applications and the like, different from the type customarily used heretofore in this field, having novel and advantageous structures and features which provide significantly improved results. A further object of the invention is to provide an enhanced-performance, single-stage regulator valve having novel and advantageous physical componentry which cooperatively provides substantially and uniquely improved results and enables use of very small inlet orifice diameter, small diaphragm diameter and small overall regulator size, providing for reduced costs as well as implementation advantages. A still further and more particular object of the invention is to provide an improved pressure regulator valve having novel internal componentry which provides velocity boosting features in a novel and enhanced manner. Another important object of the invention is to provide an enhanced-performance, low-cost regulator that lends itself effectively to the use of automated manufacturing equipment and provides for ease of assembly. Additional objects of the invention, as well as additional advantages thereof, will become apparent following consideration of the ensuing disclosure.

These and other features, advantages and objects of the present invention will be further understood and appreciated by those skilled in the art by reference to the following specification, claims and appended drawings.

BRIEF DESCRIPTION OF THE DRAWINGS

The following brief description of the figures, and the related figures themselves, exemplifies a particular preferred embodiment of the invention constituting the best mode presently contemplated. As will be understood, other embodiments of the invention as well as changes and variations in the particular structure shown in these figures are no doubt possible and may very well suggest themselves to those skilled in the art after studying this disclosure and these figures.

FIG. 8, including

DETAILED DESCRIPTION OF PREFERRED EMBODIMENT

Figure 4:
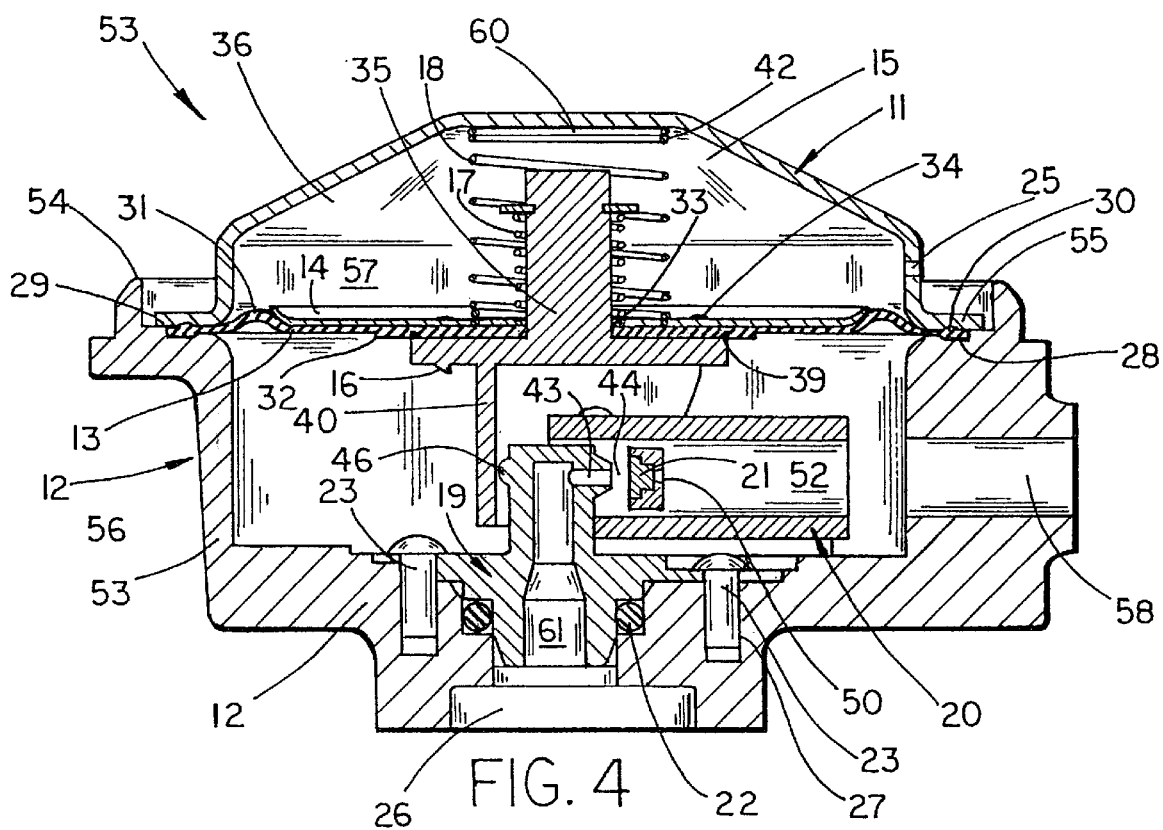
FIG. 4 is an enlarged cross-sectional side view of a regulator in accordance with the invention further illustrating internal components and their respective features.
Figure 5:
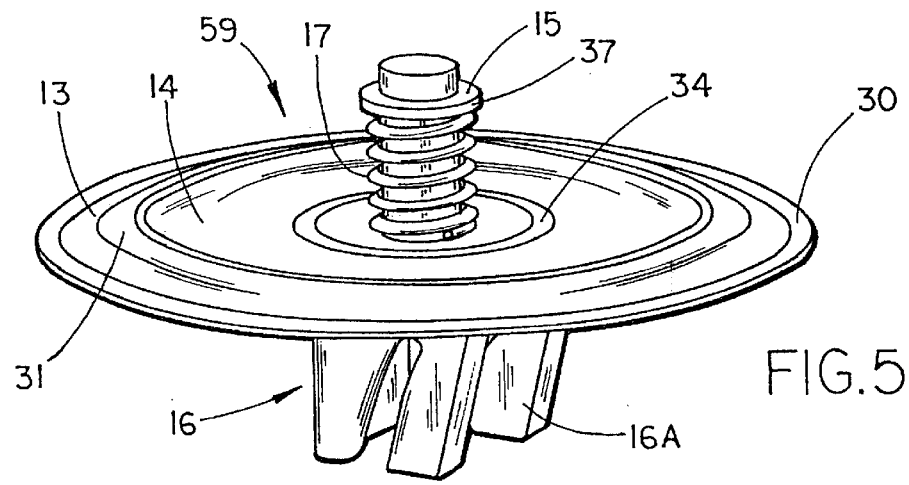
FIG. 5 is a trimetric view of the diaphragm assembly used in the regulator shown in the preceding figures.

Referring to FIG. 4, a regulator valve 53 is comprised of a generally circular dish-shaped bonnet 11 and a corresponding body 12 that are secured together by mechanically deforming a ring of material 54 on body 12 to fold over a flange 55 on bonnet 11. A generally circular fabric-reinforced elastomeric diaphragm 13 that features a molded convolution 31 is sealingly captured between bonnet 11 and body 12 to form an upper chamber 57 and a lower chamber 56. This seal is formed by the squeeze of an integral seal bead 30 extending around the edge of diaphragm 13 between flange 55 and a seal groove 28 formed in the top of body 12. The amount of squeeze required to form a seal is controlled by an annular shoulder 29 forming a positive stop that provides a rest for flange 55. Diaphragm 13 is combined with a diaphragm plate 14, relief spring 17, spring retainer 15, and actuator 16 to complete diaphragm assembly 59 (See FIG. 5).

Actuator 16 has an upstanding central post 42 (FIGS. 7 and 8) having a plurality of longitudinal ribs 41 that aid in centering diaphragm 13 and diaphragm plate 14 during assembly of these parts. Spring retainer 15 is a disc-like member having a central hole 36 (FIG. 4) that slips over post 42 of actuator 16 and includes an annular skirt or ledge 37 (FIG. 5) that compresses relief spring 17 against diaphragm plate 14. Diaphragm assembly 59 is preferably secured by an ultrasonic heat-stake operation that fixes the position of spring retainer 15 on post 42 of actuator 16. Actuator 16 has a lower extremity 16A which contacts and interacts with boost/seat tube 20, as described below, to form the control mechanism of the regulating valve. A control spring 18 (Fig.4) is compressed and centered between the top inside surface 60 of bonnet 11 and ring 34 of diaphragm plate 14.

Figure 9A:
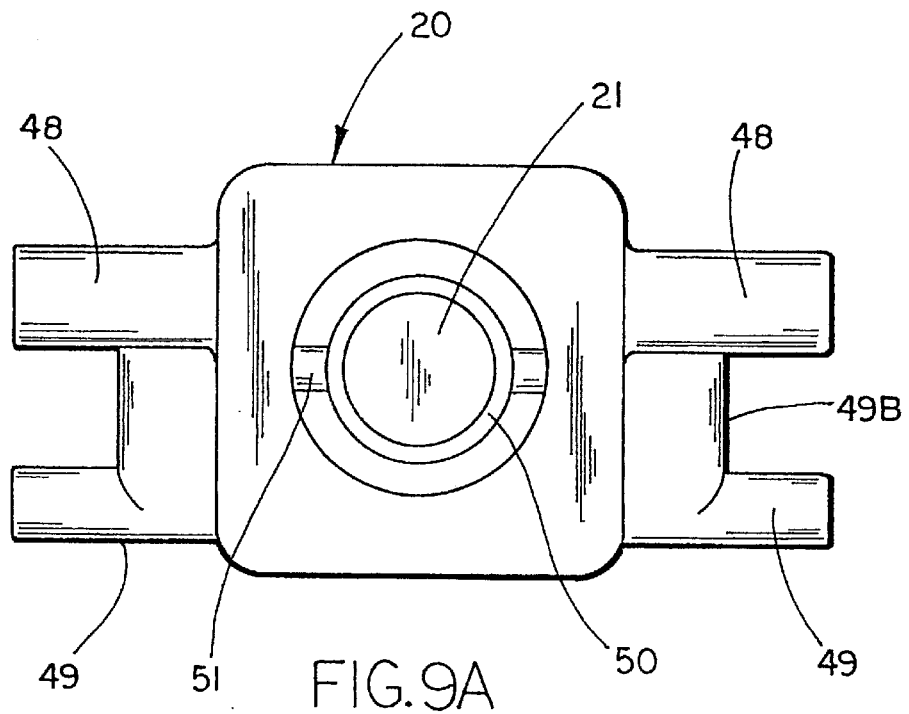
FIG. 9A is a perspective view of the preferred boost/seat tube structure used in the regulator.
Figure 9B:
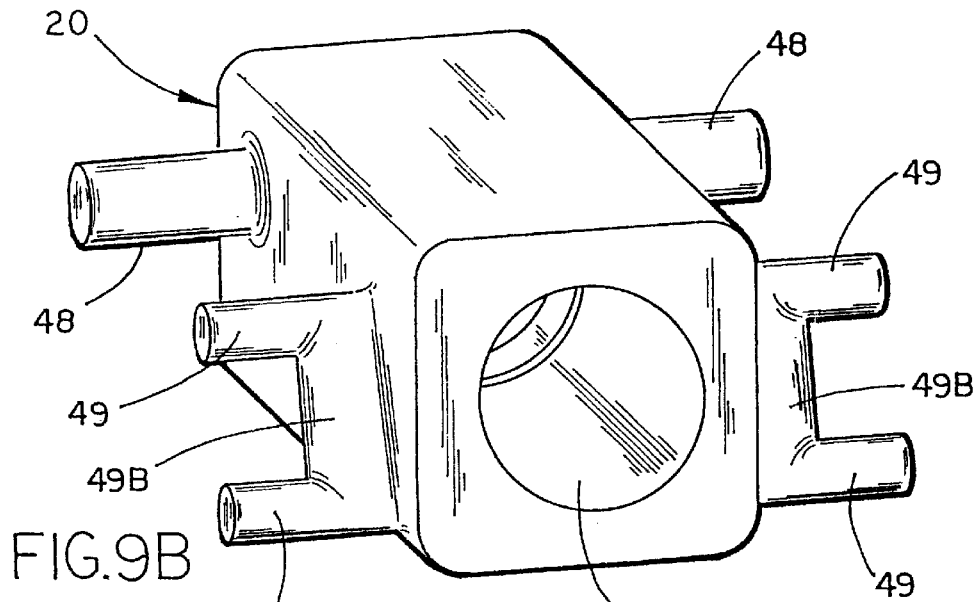
FIG. 9B is an end elevational view of the preferred boost/seat tube structure.
Figure 10A:
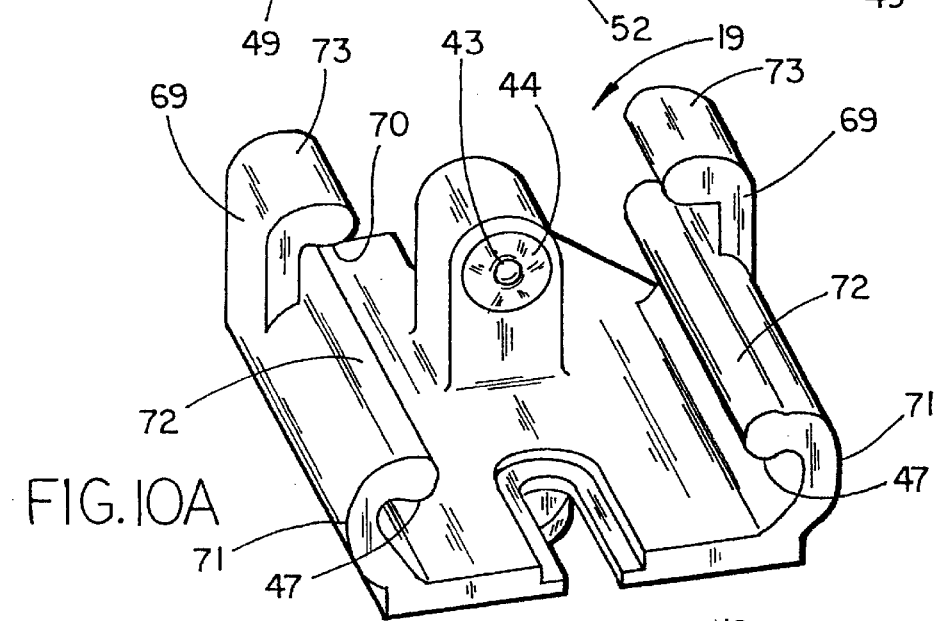
FIG. 10A is a perspective view of the preferred orifice insert used in the regulator.

Boost/seat tube 20 houses a seat disk 21 (FIGS. 4 and 9B) by means of a seat holder 50 that is suspended centrally by support ribs 51 within a smooth and otherwise-unrestricted tubular passage 52 (FIG. 9A) extending longitudinally through the boost/seat tube. Boost/seat tube 20 is restricted to linear motion toward or away from a valve seat 44 which is aligned with seat disk 21 and defined by an orifice insert member 19 (FIGS. 4 and 10). Orifice insert 19 is held in body 12 by a pair of drive screws 23 and has an o-ring 22 which encircles its lower cylindrical extremity 45 and forms a seal between orifice insert 19 and body 12. Inlet 26 of body 12 is designed to accept an inlet fitting 65 (See FIG. 11) that connects regulator valve 53 to a source of gas such as a propane supply cylinder valve. A seal is formed between inlet fitting 65 and body 12 by o-ring 67 to prevent gas leakage to atmosphere. Inlet fitting 65 is retained in body 12 by mechanically deforming inlet boss 68 on body 12 so as to force material from boss 68 into groove 66.

Referring to FIG. 4, pressurized gas from a source is applied to inlet 26, through which the gas may flow into passage 61, through orifice 43 (when the valve mechanism is open), around seat disk 21 and seat holder 50, through the tubular boost passage 52 and out passage 58 to the appliance. The initial compression of control spring 18 between bonnet 11 and diaphragm assembly 59 upon assembly forces the valve mechanism to be in the full open position before inlet gas pressure is applied to inlet 26. As illustrated, orifice 43 is elongated and preferably oriented at an angle with respect to inlet passage 61, thereby orienting the inlet gas flow directly at seat disk 21 and along the axis of boost tube passage 52. Also, as previously indicated, the diameter of orifice 43 may be considerably smaller than would otherwise be required to meet outlet flow requirements (on the order of only half that size), due to the velocity boost effect provided, helping to maintain acceptably low lockup (shutoff) inlet pressure differentials. Accordingly, the inlet gas flow substantially restricted and accelerated by the small inlet orifice, flares out around seat disk 21 and accelerates past this smoothly rounded restriction due to the "vena contracta" effect, flowing with increased velocity axially of and along boost passage 52 into outlet passage 58.

Referring to FIGS. 6–10, the operating mechanism of the described invention is mainly composed of actuator 16, boost/seat tube 20, and orifice insert 19. Actuator 16 features a pair of mutually spaced control channels 38 in its lower extremity 16A, and also has a flat vertical surface 40. The control channels 38 each provide a pair of oppositely disposed identically contoured surfaces 63, 64 which make sliding contact with one or the other of the opposite sides of a pair of control pins 48 extending outwardly from each side of boost/seat tube 20, to form a camming mechanism. Thus, as the diaphragm assembly 59 moves up and down in response to the gas pressure in chamber 57 and the spring forces acting on diaphragm 13, actuator 16 and its control channels 38 move with respect to boost/seat tube 20 and its control pins 48, translating the boost/seat tube longitudinally. The control channels 38 are preferably designed to provide a mechanical advantage of about 4:1 to ensure a seal between seat disk 21 and valve seat 44 when there is no downstream demand, and to provide a lower mechanical advantage throughout the rest of the valve mechanism motion, to induce and enhance velocity boosting effects. The minimal, reduced-area points of contact between the contoured surfaces 63, 64 and control pins 48 aid in the reduction of hysteresis, but the overall manner in which the boost/seat tube 20 is supported, moved and guided provides a very significant reduction in friction for the overall mechanism, with corresponding improved regulator operation, as noted further below.

Figure 6:
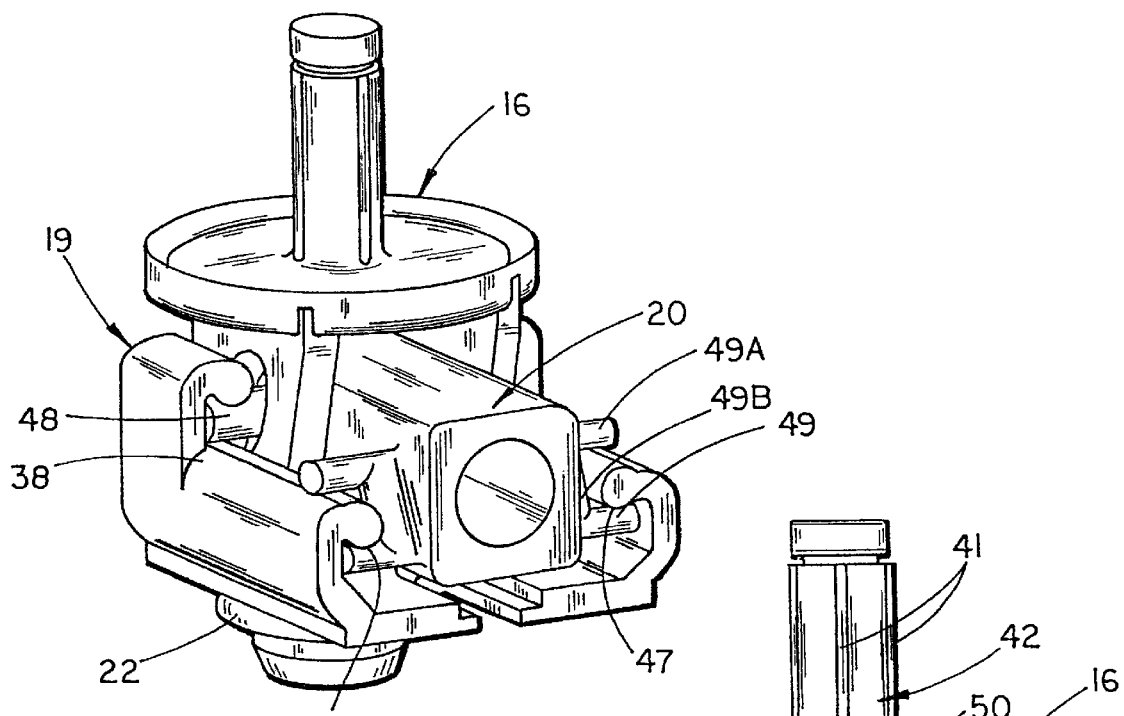
FIG. 6 is a trimetric view of the internal mechanism of the regulator, showing the boost/seat tube with its mounting and actuation means.
Figure 7:
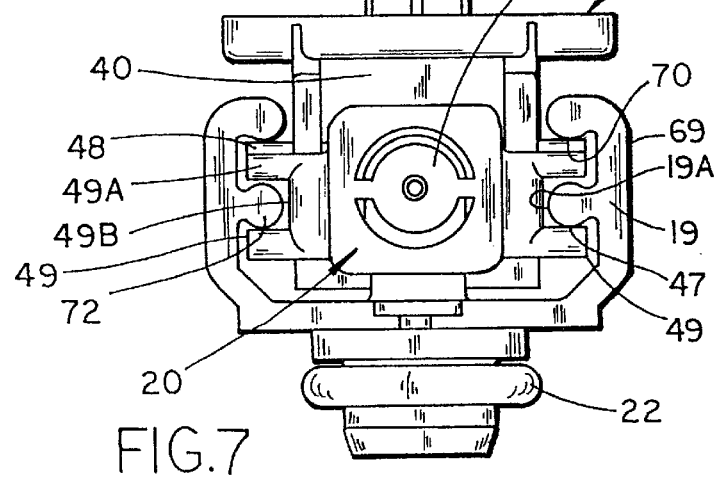
FIG. 7 is a right side view of the internal mechanism of the regulator shown in FIG. 6.
Figures 8A, 8B:
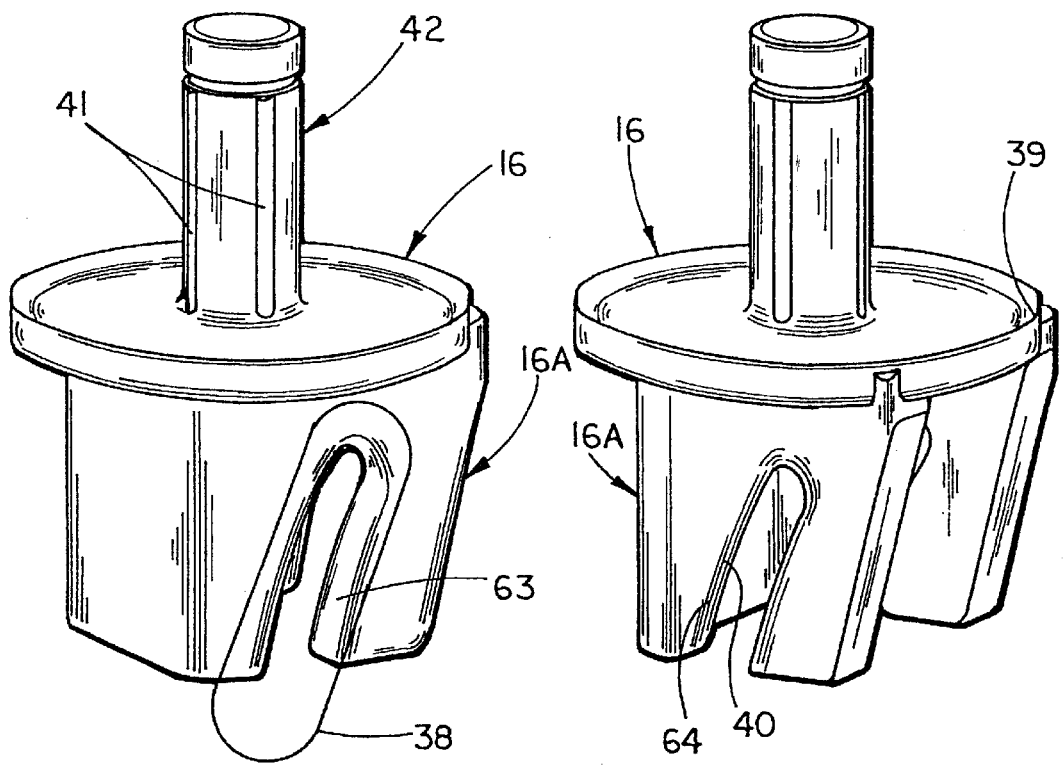
FIGS. 8A and 8B, is a two-view perspective showing the valve-controlling actuator used in the preferred embodiment, which comprises part of the diaphragm assembly shown in FIG. 5.
Figure 10B:
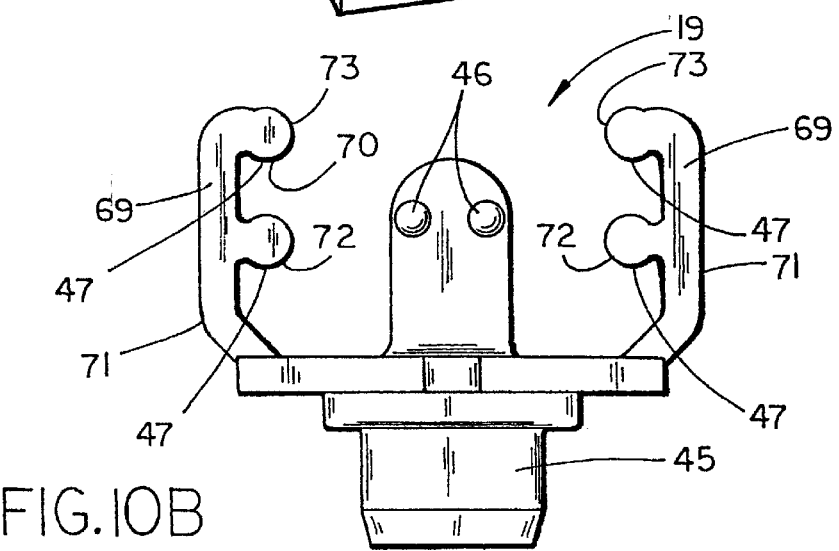
FIG. 10B is an end elevational view of the preferred orifice insert structure.
Figure 11:
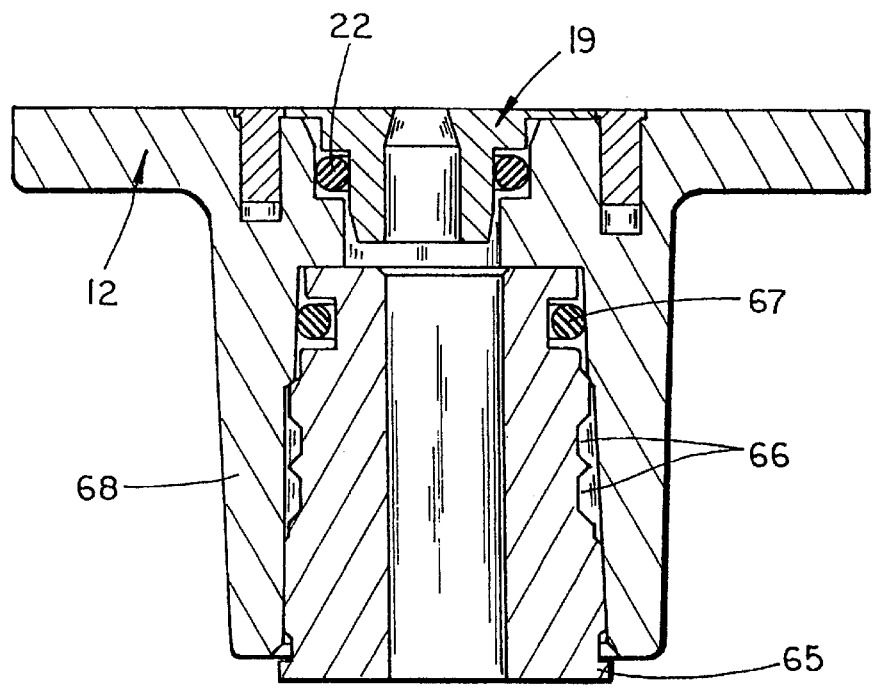
FIG. 11 is an enlarged front cross-sectional view showing the gas inlet of the valve body with its inlet fitting and seal.

Boost/seat tube 20 is restricted to move in a linear fashion toward or away from valve seat 44 by the outermost end portions of control pins 48 and by a pair of guide pins 49 extending from opposite sides of the boost/seat tube 20 at a location along its length spaced from pins 48 (FIGS. 6, 7, and 9), which ride along guide surfaces 47, 70 that are formed on the underside of generally cylindrical guides 72, 73 formed on the extended ends of upstanding arms 69, 71 of orifice insert 19 (FIGS. 6, 7, and 10). The contact points between these pins and guides are the transverse intersection of cylindrical shapes, providing smoothly rounded point-to-point contact area that reduce friction in the motion of the boost/seat tube 20 and related valve mechanism. Orifice insert 19 also has two contact points 46 (FIGS. 4 and 10B) that contact the flat vertical surface 40 of actuator 16 to provide consistent bi-directional linear motion with reduced friction.

It is to be noted that the structure and interrelationship of the slidable mechanism just described produces a unique low-friction support and guidance arrangement for the boost/seat tube 20. More particularly, as indicated above and as shown in FIG. 7 (depicting the mechanism in actual operation), the boost/seat tube 20 becomes elevated during operation, with control pins 48 and guide pins 49 riding along the underside of guide surfaces 70 and 47 respectively rather than along the top of cylindrical member 72. This is caused by the shape and relative positioning of the component parts, including the contoured control channels 38, the pre-load effect of control spring 18, the inlet gas pressure and the chamber pressure, which combine to maintain a force couple on the boost/seat tube 20 centering about its control pins 48 and acting to counterbalance the weight of the boost/seat tube 20, elevating the latter to the generally cantilevered "floating" position just noted with respect to guide element 72 of orifice insert 19. This light sliding contact of pins 48 and 49 along guide surfaces 70 and 49 is the only contact between the boost/seat tube 20 and orifice insert 19, i.e., as illustrated in FIG. 7, the outward ends of pins 48, 49 and 49A do not contact the adjacent inside surfaces of orifice insert arms 69 and 71, and the rounded end extremity 19A of guide element 72 does not contact the adjacent side of boost/seat tube 20 or the mid-portion 49B between pins 49 and 49A.

The force vectors acting on boost/seat tube 20 which produce the force couple noted above are illustrated in FIG. 12, showing the boost/seat tube from the side. The "Contact Force" vector shown there, acting downwardly on pins 48 and 49, represents engagement of these members with guide surfaces 70 and 47, respectively, and the "Control Force" vector on pin 48 represents its engagement with the contoured control channel 38, in particular surface 63 thereof. The "Unbalance Force" essentially represents the inlet gas pressure acting on the face of the valve disk 21 and its annular mount 50. As a result of these factors, the larger-area bottom surfaces of the boost/seat tube 20 never contact or ride upon the adjacent surfaces of the orifice insert 19, and even pins 48 and 49A of the boost/seat tube normally remain above and out of contact with the top surface of cylindrical guide element 72 of orifice insert 19 (FIG. 7). Consequently, the amount of sliding friction which results during movement of the boost/seat tube toward and away from valve orifice 44 and the inlet end of outlet passage 58 is minimal, even though the boost/seat tube 20 is at all times being smoothly and positively guided.

As will be understood, during initial assembly of the operating mechanism, after the orifice insert 19 has been secured in place in body 12, the boost/seat tube 20 is loosely slid into its position between arms 69 and 71 of the orifice insert 19, with pins 48 disposed between guide projections 72 and 73 and pins 48 and 49A resting atop guide projection 72. The axially displaced disposition of pins 49A with respect to pins 49 tends to limit the extent of allowable boost/seat tube tilt under these conditions since they engage the elongated guide surface 72 at different points and can be used to hold the forward portion of the boost/seat tube 20 in a somewhat elevated position in which seat disk 21 remains somewhat aligned with seat/orifice 43. Actuator 16 is then inserted into place from above, along with the rest of diaphragm assembly 59, with cam slots 38 sliding over and receiving pins 48. When the diaphragm assembly has been placed into position atop body 12, the bonnet 11 is then positioned over the diaphragm assembly and secured in place. When the bonnet 11 is so placed and secured, the top surface 60 of bonnet 11 contacts the top of control spring 18 and applies the aforementioned preload to it, while at the same time forcing actuator 16 downwardly. Since the contoured control channels or cam slots 38 are engaged over the guide pins 48, this downward movement of actuator 16 and the force of spring 18 moves the control channels 38 downward relative to the control pins 48, causing corresponding movement of the boost/seat tube 20 toward the right as seen in FIG. 4, opening the valve by moving seal 21 away from seat 44.

Figure 12:
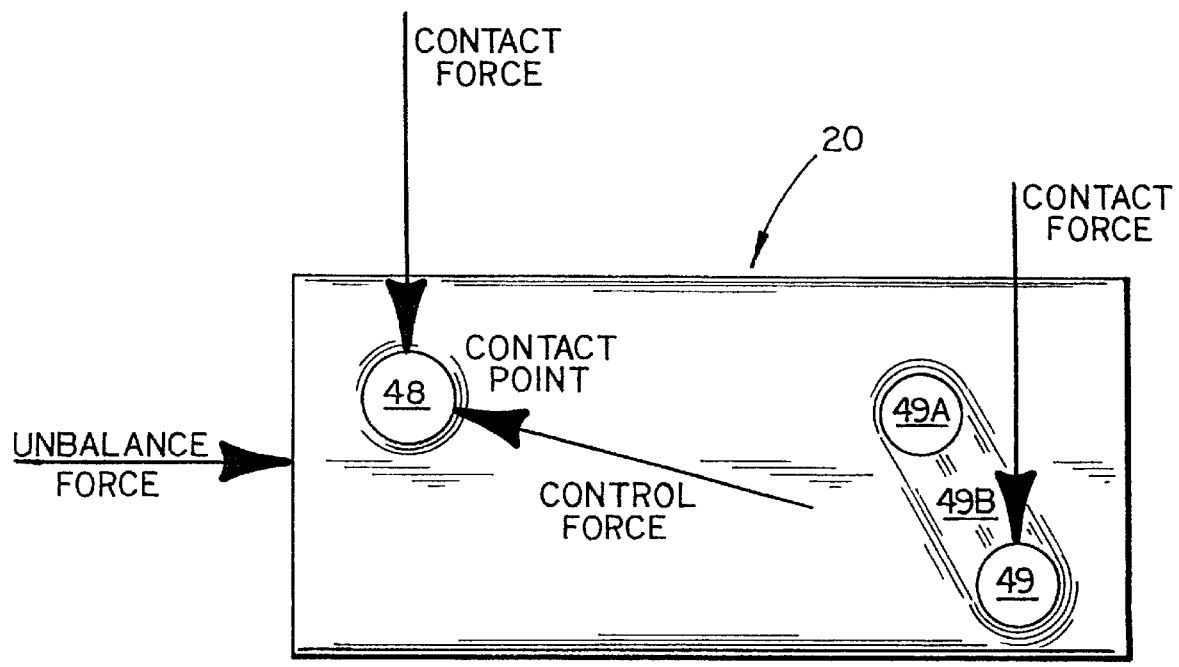
FIG. 12 is an enlarged side view of the preferred boost/seat tube, showing the force vectors acting thereon during operation.

Referring to FIGS. 4, 7, and 12 with the valve mechanism initially in its full open position as noted above, as gas is applied through inlet 61 and flows through orifice 43 it enters the adjacent end of boost/seat tube 20, flows over and around seat disk 21 into boost tube passage 52, and passes through the latter into outlet passage 58. Between passages 52 and 58, some of the gas also enters chamber 56, where its pressure is applied across the effective area of diaphragm 13. This offsets the force of control spring 18 and moves diaphragm assembly 59 upward, whereupon control channels 38 move upwardly while contacting control pins 48 to force boost/seat tube 20 and seat disk 21 toward valve seat 44, forming a restriction that controls flow to match downstream demand. In addition, the force of the inlet gas pressure acting on valve seat disk 21 creates the "Unbalance Force" noted above in connection with FIG. 12. As shown there, this force vector is generally aligned along the axis of boost/seat tube 20, and below the control pins 48. The effect of this is to elevate the entire boost/seat tube 20 by rotating it to the position shown in FIG. 7, wherein pins 48 and 49A are moved upward to a position above and spaced from guide projections 72. In this position, the top of pins 48 engage the underside surface 70 of guide member 73, and the top of pins 49 engage the underside 47 of guide members 72, thereby creating the low-friction smoothly guided operating conditions noted above.

It should be noted that in the event there is no downstream demand, gas pressure increases inside chamber 56 until seat disk 21 forms a seal on valve seat 44, causing a zero flow or lockup condition. In this regard, the described invention also includes a safety feature commonly referred to as pressure relief. If pressure increases in chamber 56 to a predetermined percentage above lockup pressure, it is applied across the effective area of diaphragm 13 to offset the force of both control spring 18 and relief spring 17, allowing diaphragm plate 14 and relief seal 32 of diaphragm 13 to move upward and off of relief seat 39 and allowing flow of gas through relief holes 33 and 35 of diaphragm 13 and diaphragm plate 14, respectively. This flow of gas can then escape to atmosphere from chamber 57 through vent hole 25 in bonnet 11, reducing the pressure to a value which allows the assembly to reseal and return to normal operation. Additionally, if the mechanism becomes dislodged by some means allowing diaphragm assembly 59 to travel upward without resistance caused by the lockup condition, post 42 of actuator 16 is designed to contact surface 60 of bonnet 11, stopping the vertical motion and allowing the relief mechanism to operate as described above.

As described previously, the mechanism of this device operates to control flow to meet downstream demand. When demand increases, outlet pressure decreases and this results in downward movement of diaphragm 13 and its related parts, including actuator 16, causing seat disk 21 to move away from valve seat 44 and thereby allowing more flow through the device to supply the new demand. This continues until the demand is satisfied and an equilibrium state is reached. Conversely, the same events occur in reverse for conditions of decreasing demand. Changes in inlet pressure and/or demand will cause the device to compensate by opening or closing the valve mechanism in response to the new conditions, to again reach an equilibrium state. Since seat disk 21 and its seat holder 50 are integrally attached to and part of the boost/seat tube 20, it will be understood that the entire boost/seat tube moves with corresponding movements of seat disk 21 toward and away from seat 44. During times of increasing flow through the device, when seat disk 21 moves away from seat 44, the end of the boost/seat tube 20 located nearest the entrance to outlet passage 58 moves increasingly closer thereto, thereby increasingly directing the increased flow of pressurized gas outward through passage 58. This has the effect of increasingly aspirating chamber 56 and reducing the pressure therein which acts on the underside of diaphragm 13. Conversely, movement of boost/seat tube 20 and seat disk 21 in the opposite direction, at times when the flow of gas is being reduced, moves the end of boost/seat tube 20 away from the entrance to outlet passage 58, causing an increased widening of the opening into chamber 56 and reducing the velocity-boost/pressure-aspiration effects and allowing increased pressure within the latter. Accordingly, the velocity boosting effect provided by the boost/seat tube 20 is correspondingly varied, and enhanced. Through the use of enhanced velocity boosting and reduced hysteresis, the described invention provides a pressure regulator having considerably improved operation.

Figure 1:
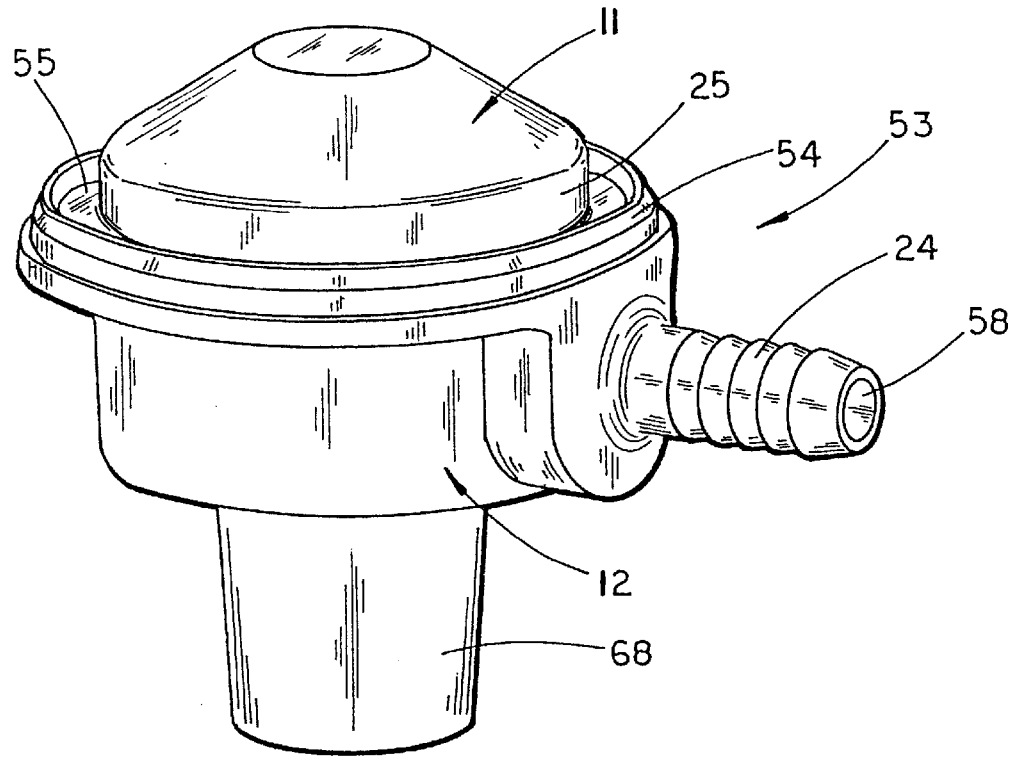
FIG. 1 is a perspective representation of an assembled pressure regulator in accordance with the invention that shows external features of a single-outlet version of the device.
Figure 2:
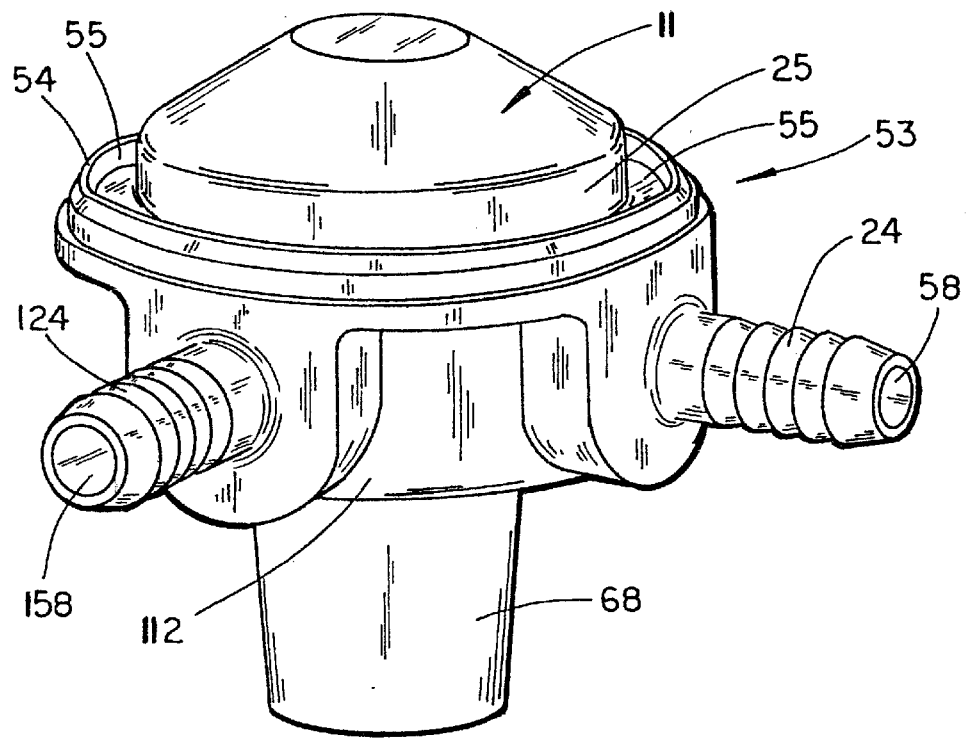
FIG. 2 is a perspective representation of an assembled regulator in accordance with the invention that shows external features of a dual-outlet version of the device.
Figure 3:
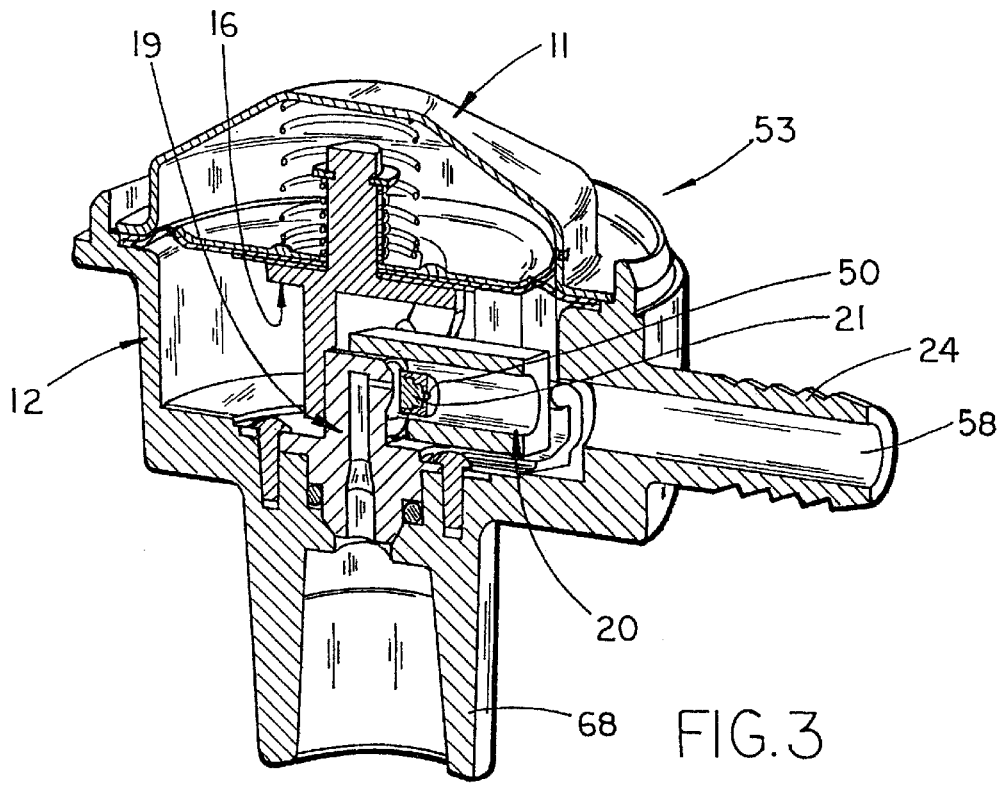
FIG. 3 is a trimetric cross-sectional view of a regulator in accordance with the invention which shows the shape, location and relationship of internal components of the device.

Bonnet 11 (aluminum), body 12 (zinc), diaphragm plate 14 (plated steel), spring retainer 15 (plated steel), control spring 18 (stainless steel), relief spring 17 (stainless steel), and drive screw 23 (stainless steel) are preferably all rigid metal components. Diaphragm 13, seat disk 21, and o-ring 22 are flexible elastomeric components. Actuator 16, boost/seat tube 20, and orifice insert 19 are preferably constructed of rigid engineering thermoplastic resins such as Acetal, Polyethylene Terephthalate. Referring to FIG. 2, body 112 offers a second integral barbed outlet 124 with through-hole 158 to provide gas flow to appliances that have both a main burner and a smaller capacity side burner for propane outdoor cooking appliance applications.

The described invention provides consistent repeatable performance over a wide range of inlet pressures and flow rates while also enabling significant reduction in inlet orifice diameter (as much as one-half) and in diaphragm and overall regulator size; e.g., on the order of as much as one-third, compared to conventional diaphragm-type regulators. The foregoing detailed description is considered that of a preferred embodiment only, and the particular shape and nature of at least some of the components (especially the orifice insert 19 and boost/seat tube 20) in this embodiment are at least partially based on manufacturing (e.g., molding) advantages and considerations as well as on those pertaining to assembly and operation. Modifications of this embodiment may well occur to those skilled in the art and to those who make or use the invention after learning the nature of this preferred embodiment, and the invention lends itself advantageously to such modifications and alternative embodiments. Therefore, it is to be understood that the embodiment shown in the drawings and described above is provided principally for illustrative purposes and should not be used to limit -the scope of the invention, which is defined by the following claims as interpreted according to the principles of patent law, including the doctrine of equivalents.

We claim:

1. A direct-acting boost-enhanced gas pressure regulator, comprising in combination:

a body having a regulator chamber with a gas inlet and outlet, said chamber communicating through a variable opening with gas flowing between said inlet and outlet, to be pressurized thereby;

a variable valve mechanism and a pressure-responsive member disposed in communication with the gas pressure in said chamber and coupled to said valve mechanism, for controlling gas flow between said inlet and outlet in response to the amount of pressure inside said chamber;

a boost tube structure within said chamber, including a generally tubular member with a longitudinal axis, said generally tubular member having a passage for gas flow in a longitudinal direction therethrough between said inlet and outlet, said generally tubular member being movably mounted to form a variably continuous passage between said inlet and outlet and to form said variable opening in coordination with the operation of said valve mechanism, in a manner decreasing the pressure communicated to the inside of said chamber as said valve mechanism is varied to increase gas flow between said inlet and outlet;

said variable valve mechanism including a movable valve member coupled to said generally tubular member of said boost tube structure and operatively disposed within said passage of said generally tubular member whereby gas flows within said generally tubular member from the inlet past the valve member, and to the outlet; and a coupling mechanism directly connecting said pressure-responsive member and said boost tube structure to move said generally tubular member in direct response to the amount of gas pressure within said chamber, said coupling mechanism having mutually spaced first and second portions with said first portion engaging said pressure-responsive member and said second portion slidably engaging at least one external surface of said boost tube structure, said at least one external surface extending outwardly and transversely from said boost tube structure, said coupling mechanism causing movement of said tubular member in a direction substantially perpendicular to a central axis of said pressure-responsive member.

2. A gas pressure regulator as set forth in claim 1, wherein said valve mechanism includes a seat and said valve member is movable toward and away from said seat to vary gas flow between said inlet and outlet, and wherein said generally tubular member extends at least partially over and around said seat such that said member at least partially shrouds the seat and its surrounding area.

3. A gas pressure regulator as set forth in claim 1, wherein said generally tubular member surrounds said valve member and defines substantially free-flowing areas for gas therebetween within said boost tube structure.

4. A gas pressure regulator as set forth in claim 3, wherein said valve mechanism includes a seat and said valve member is movable toward and away from said seat to vary gas flow between said inlet and outlet, and wherein said tubular member extends at least partially over and around said seat to at least partially shroud the seat and its surrounding area.

5. A gas pressure regulator as set forth in claim 1, wherein said inlet, outlet and movably mounted generally tubular member define said variable opening communicating with said chamber.

6. A gas pressure regulator as set forth in claim 5, wherein said opening is variable in size in relation to movement of said generally tubular member.

7. A gas pressure regulator as set forth in claim 1, wherein said boost tube structure includes a low-friction suspension mounting for said movably mounted generally tubular member, comprising a plurality of separate and mutually spaced guide elements extending longitudinally along the outside of said generally tubular member and slidable coupling elements extending from said generally tubular member into contact with said guide elements such that said generally tubular member slides longitudinally along said guide elements on said coupling elements as said generally tubular member moves relative to said inlet and outlet.

8. A gas pressure regulator as set forth in claim 7, including an inlet orifice structure mounted in said body and providing said spaced guide elements.

9. A gas pressure regulator as set forth in claim 8, wherein said inlet orifice structure also provides a valve seat for said movable valve member.

10. A gas pressure regulator as set forth in claim 9, wherein said valve member of said valve mechanism is mounted for movement toward and away from said valve seat to vary the flow of gas through said inlet.

11. A gas pressure regulator as set forth in claim 10, wherein said valve member is coupled to said boost tube member to move conjointly therewith.

12. A gas pressure regulator as set forth in claim 10, wherein said valve seat is disposed near the end of a projection and at least a portion of said generally tubular member is telescopingly disposed over said projection to hood said valve seat.

13. A gas pressure regulator as set forth in claim 12, wherein said telescopingly disposed portion of said generally tubular member is slidable with respect to said valve seat.

14. A gas pressure regulator as set forth in claim 7, including an actuator coupled to said generally tubular member to impart said sliding movement thereto while also positioning said generally tubular member for low-friction contact with said guide elements.

15. A gas pressure regulator as set forth in claim 14, wherein said actuator includes a pair of mutually spaced cam surfaces and said boost tube structure includes a pair of correspondingly spaced cam-follower members which each engage a respective one of said cam surfaces to move said generally tubular member in response to movement of said actuator.

16. A gas pressure regulator as set forth in claim 15, wherein said cam surfaces and cam-follower members co-act to move said boost tube structure and said generally tubular member along with at least portions of said valve mechanism.

17. A gas pressure regulator as set forth in claim 16, including an inlet orifice structure mounted in said body and providing a seat for said movable valve member.

18. A gas pressure regulator as set forth in claim 17, wherein said valve seat is disposed near the end of a projection and at least a portion of said generally tubular member is telescopingly disposed over said projection to hood said valve seat.

19. A gas pressure regulator as set forth in claim 18, wherein said telescopingly disposed portion of said generally tubular member is slidable with respect to said valve seat.

20. A gas pressure regulator as set forth in claim 1, including a pressure-sensing element located at least partially within said chamber and an actuator directly coupled to said pressure-sensing element for moving said valve member in response to pressure variations sensed by said sensing element.

21. A gas pressure regulator as set forth in claim 20, wherein said actuator includes a pair of mutually spaced cam surfaces and said boost tube structure includes a pair of correspondingly spaced cam-follower members each of which engage a respective one of said cam surfaces to move said valve member in response to movement of said actuator.

22. A gas pressure regulator, comprising in combination:
a body having an internal cavity with an inlet and outlet for pressurized gas;
a regulator chamber communicating with a movable closure member through a passage area with pressurized gas flowing from said inlet to said outlet, to hold a quantity of said gas under pressure;
a variable valve mechanism including a movable valve member for controlling the amount of said gas flow from said inlet to said outlet in response to the magnitude of said gas pressure within said chamber;
the movable closure member for effectively varying the size of said passage area to thereby vary the communication of gas pressure conditions to said regulator chamber;
a low-friction slide mounting for said movable closure member comprising at least a pair of mutually spaced rail members supported in said body and extending along a same side of said closure member to define a predetermined path of closure member movement, and at least a pair of corresponding spaced slide elements and an outwardly extending control member on the outside of said closure member and disposed to slidably engage and travel along said rail members to ensure that movement of said closure member accurately follows along said predetermined path, said movable closure member being loosely disposed between said rail members;
an actuator for at least partially supporting said closure member in a predetermined position while it is moved to effectively vary the size of said passage area, said slide elements being disposed in light sliding contact with only some of said rail members and being held free of other such rail members during actual operation to reduce friction effects; and
said closure member having first and second ends and said control member located nearer said first end than said second end, said actuator supporting said closure member from a position nearer the first of said spaced ends than the second, whereby said closure member is suspended in generally cantilevered fashion during actual operation.

23. A gas pressure regulator as recited in claim 22, wherein said slide elements project outwardly from the outside of said movable closure member and at least some of said slide elements are disposed in light sliding contact with said rail members, said closure member moving by said at least some slide elements sliding along said rail members.

24. A gas pressure regulator as recited in claim 23, wherein said slide elements are disposed in light sliding contact with only some of said rail members and are held free of other such rail members during actual operation to reduce friction effects.

25. A gas pressure regulator as recited in claim 24, wherein said closure member is elongated in shape and said first and second ends are spaced apart from one another.

26. A gas pressure regulator as recited in claim 25, wherein said closure member is supported at least in part by a force couple applied thereto at said position nearer said first end.

27. A gas pressure regulator as recited in claim 26, wherein said valve member is attached to said closure member for movement therewith by said actuator.

28. In a boost-enhanced gas pressure regulator, of the type having a regulator chamber with an inlet and an outlet, a variable valve mechanism for controlling gas flow between said inlet and outlet in response to the amount of pressure inside said chamber, and a boost tube defining structure movably mounted between said inlet and outlet to form a passage of variable closure degree therebetween in response to the operation of said valve mechanism and corresponding gas flow conditions between said inlet and outlet, the improvement wherein said boost tube-defining structure comprises an elongated member having an internal passage for gas flow and external actuation structure by which said member may be moved longitudinally toward and away from said outlet, said external actuation structure comprising at least one engagement element secured to said elongated member and having portions extending generally transversely of and outwardly from said elongated member, and further including an actuator member having a cam surface for slidably engaging said outwardly-extending portions of said at least one engagement element and thereby moving said elongated member longitudinally toward or away from said outlet.

29. The improvement for a boost-enhanced gas pressure regulator as set forth in claim 28, wherein said engagement element comprises at least one projection formed integrally with and extending outwardly from said elongated member; and wherein said actuator member includes a cam surface for slidably engaging and acting upon said at least one projection to thereby move both said projection and said elongated member by camming action.

30. The improvement for a boost-enhanced gas pressure regulator as set forth in claim 28, wherein said cam surface is contoured to apply differing degrees of mechanical advantage to said engagement element at different positions of movement of said elongated member.

31. The improvement for a boost-enhanced gas pressure regulator as set forth in claim 28, wherein said cam surface and said engagement element are configured to apply an angular moment to said engagement element during camming movement thereof under conditions of actual operation and thereby apply a transverse positioning force to said elongated member during its longitudinal movement caused by said camming.

32. The improvement for a boost-enhanced gas pressure regulator as set forth in claim 31, wherein said cam surface comprises at least one slot disposed between a pair of oppositely-disposed and mutually spaced cam faces.

33. The improvement for a boost-enhanced gas pressure regulator as set forth in claim 32, wherein said engagement element comprises a pin member having a cross section which fits into said slot.

34. The improvement for a boost-enhanced gas pressure regulator as set forth in claim 31, further including at least one slide element on the outside of said elongated member disposed for sliding contact with an elongated guide surface extending along the outside of said elongated member, said transverse positioning force acting to hold said at least one slide element in at least light sliding contact with said guide surface.

35. The improvement for a boost-enhanced gas pressure regulator as set forth in claim 31, wherein said transverse positioning force acts to move said elongated member at least partially out of contact with adjacent structure within said chamber during said longitudinal movement of said member.

36. The improvement for a boost-enhanced gas pressure regulator as set forth in claim 35, further including at least one slide element on the outside of said elongated member disposed for sliding contact with an elongated guide surface extending along the outside of said elongated member, said transverse positioning force acting to hold said slide element in at least light sliding contact with said guide surface.

37. The improvement for a boost-enhanced gas pressure regulator as set forth in claim 36, wherein said cam surface comprises at least one slot having a pair of oppositely-disposed and mutually spaced cam faces.

38. The improvement for a boost-enhanced gas pressure regulator as set forth in claim 28, herein said internal passage has a smooth, continuous and substantially uninterrupted peripheral wall which is substantially devoid of gas flow restrictions, and including a valve element disposed within said passage and spaced from said peripheral wall by open areas providing for minimal gas flow restriction.

* * * * *